United States Patent [19]

Lehner et al.

[11] Patent Number: 5,217,810
[45] Date of Patent: Jun. 8, 1993

[54] MAGNETIC RECORDING MEDIUM HAVING A MAGNETIC LAYER CONTAINING CHROMIUM DIOXIDE PARTICLES AND LINOLENIC ACID

[75] Inventors: August Lehner, Roedersheim-Gronau; Rudolf Suettinger, Heidelberg; Michael Bobrich, Boehl-Iggelheim; Hermann Dikow, Hockenheim; Hermann Roller, Ludwigshafen; Werner Lenz, Bad Durkheim; Ludwig Kreitner, Heppenheim; Werner Loch, Erpolzheim; Norbert Schneider, Altrip, all of Fed. Rep. of Germany

[73] Assignee: BASF Aktiengesellschaft, Ludwigshafen, Fed. Rep. of Germany

[21] Appl. No.: 853,841

[22] Filed: Mar. 19, 1992

Related U.S. Application Data

[63] Continuation of Ser. No. 448,948, Dec. 12, 1990, abandoned.

[30] Foreign Application Priority Data

Dec. 23, 1989 [DE] Fed. Rep. of Germany ....... 3843445

[51] Int. Cl.$^5$ ................................................. G11B 5/00
[52] U.S. Cl. ................................ 428/403; 428/694 B; 428/900; 428/694 BA; 252/62.54
[58] Field of Search .............. 428/694, 900, 407, 403; 252/62.51, 62.53, 62.54; 423/607

[56] References Cited

U.S. PATENT DOCUMENTS

| | | | |
|---|---|---|---|
| 2,871,218 | 1/1959 | Schollenberger | 525/440 |
| 3,512,930 | 5/1970 | Bottjer et al. | 423/274 |
| 3,585,141 | 6/1971 | Ingersoll | 252/62.54 |
| 3,634,253 | 1/1972 | Akashi | 252/62.54 |
| 3,686,031 | 8/1972 | Balthis | 252/62.51 |
| 3,687,726 | 8/1972 | Pye | 428/404 |
| 3,767,580 | 10/1973 | Kitamoto et al. | 252/62.51 |
| 3,819,411 | 6/1974 | Kitamoto et al. | 428/480 |
| 3,880,689 | 4/1975 | Rolker et al. | 156/233 |
| 4,201,809 | 5/1980 | Ogawa et al. | 428/65 |
| 4,755,337 | 7/1988 | Takahashi et al. | 264/134 |
| 4,789,583 | 12/1988 | Akutsu | 428/143 |
| 5,126,215 | 6/1992 | Aonoma et al. | 428/694 |

FOREIGN PATENT DOCUMENTS

| | | |
|---|---|---|
| 0029687 | 6/1983 | European Pat. Off. |
| 0078042 | 4/1985 | European Pat. Off. |
| 0248402 | 12/1987 | European Pat. Off. |
| 2749757 | 5/1979 | Fed. Rep. of Germany |
| 51-21200 | 2/1976 | Japan |
| 57-006438 | 1/1982 | Japan |

*Primary Examiner*—Paul J. Thibodeau
*Assistant Examiner*—Stevan A. Resan
*Attorney, Agent, or Firm*—Keil & Weinkauf

[57] ABSTRACT

Magnetic recording media consisting of a nonmagnetic substrate and at least one magnetizable layer which is firmly applied thereon and is based on a magnetic material which essentially consists of ferromagnetic chromium dioxide and is finely dispersed in a polymer binder and further conventional additives are distinguished by a particular stability to the chemical decomposition due to moisture and oxidizable compounds and hence particular stability to the deterioration in the magnetic properties, as a result of the addition of from 0.1 to 8% by weight, based on the amount of chromium dioxide, of a monomeric, polyunsaturated, organic compound to the magnetic layer.

1 Claim, No Drawings

MAGNETIC RECORDING MEDIUM HAVING A MAGNETIC LAYER CONTAINING CHROMIUM DIOXIDE PARTICLES AND LINOLENIC ACID

This application is a continuation application of Ser. No. 07/448,948, filed Dec. 12, 1990, now abandoned.

The present invention relates to magnetic recording media consisting of a nonmagnetic substrate and at least one magnetizable layer which is firmly applied thereon and is based on a magnetic material which essentially consists of ferromagnetic chromium dioxide and is finely dispersed in a polymer binder and further conventional additives, which recording media have particular stability to the chemical decomposition due to moisture and oxidizable compounds and hence stability to the deterioration in the magnetic properties.

Acicular, ferromagnetic chromium dioxide, its preparation and the use of this material for magnetic recording media have often been described. Magnetic recording media which contain chromium dioxide generally have magnetic properties which are superior to those of recording media based on other magnetic oxides.

However, it is also known that the magnetic properties of recording media containing chromium dioxide deteriorate in the course of time. Ferromagnetic chromium dioxide in powder form is substantially stable in the absence of moisture and furthermore there is no detectable change in the magnetic properties over a long time. However, it has been observed that chromium dioxide can be attacked both by water and by other materials, for example the organic polymer binders used in the production of magnetic recording media, with decomposition to form nonmagnetic components. In the case of magnetic recording media, this means not only a loss of the magnetic and hence electroacoustic properties but also a deterioration in the mechanical properties. This deterioration is further accelerated at higher temperatures. There has therefore been no lack of attempts to overcome these disadvantages. For example, US-A 3 512 930 describes the treatment of chromium dioxide powder with a reducing agent. In other processes, alumina coatings (US-A 3 687 726) or coatings of sparingly soluble metal phosphates (US-A 3 686 031) are produced. The application of metal compounds whose cations are capable of forming sparingly soluble chromates has also been disclosed (DE-B 21 52 331). JA-A-21200/76 proposes applying magnetic iron oxides to the surface in order to coat the chromium dioxide particles, while according to DE-A-27 49 757 iron(III)-containing oxidic precipitates are applied to the chromium dioxide. EP-B 0078042 describes a stabilization process in which metals, e.g. iron, zinc, cobalt or manganese, are incorporated in the surface of the chromium dioxide particles. An attempt has also been made to increase the stability merely by heat treatment of the chromium dioxide in an inert gas atmosphere (EP-B 0029687) or in air (EP-B 0248402).

However, all these processes have the disadvantage that the magnetic properties of the chromium dioxide materials treated are greatly diminished by a non-magnetic surface layer, which is achieved either by coating with foreign compounds or by a decomposition layer, but the recording media produced using the chromium dioxide materials obtained by these processes do not possess long-term stability sufficient to meet present requirements, particularly in the computer sector. The attempts to stabilize magnetic recording media containing chromium dioxide by adding to the dispersion ionic compounds whose cation forms a sparingly soluble chromate, as proposed, inter alia, in DE-A 21 62 332, also did not result in sufficient stability, in particular the required long-term stability.

It is an object of the present invention to provide magnetic recording media which contain chromium dioxide and, without substantial deterioration in the magnetic properties, have improved stability to the chemical decomposition due to moisture and oxidizable, generally organic compounds, and hence ensure the required long-term stability of the magnetic recording.

We have found that this object is achieved by a magnetic recording medium consisting essentially of a nonmagnetic substrate and at least one magnetizable layer which is firmly applied thereon and is based on a magnetic material which essentially consists of ferromagnetic chromium dioxide and is finely dispersed in a polymer binder and further conventional additives if the magnetizable layer additionally contains from 0.1 to 8% by weight, based on the amount of chromium dioxide, of a monomeric, polyunsaturated, organic compound.

The monomeric, polyunsaturated, organic compounds according to the invention are alcohols, acids, esters, di- or triglycerides or vitamins, for example 2,4-hexadienoic acid, 9c,12c-octadecadienoic acid, 6c,10c,14c-hexadecatrienoic acid, 9c,12c,15c-octadecatrienoic acid, 9c,11c,13c-octadecatrienoic acid, 4,8,12,15-octadecatetraenoic acid, 9,10,13,15-octadecatetraenoic acid, 4,8,12,15,18-eicospentaenoic acid, 4,8,11,14,17,20-docosahexaenoic acid, octadec-17-enediyn-9,11-enoic acid, 9c,12c-octadecadien-1-ol, 9c,12c,15c-octadecatrien-1-ol, 5,8,11,14-ecosatetraen-1-ol, 4-keto-9c,11c,13c-octadecatrienoic acid, linseed oil (50–60% of lindenoic acid and 12–16% of linoleic acid), herring oil (20–30% of $C_{20}$ acid having 2–6 double bonds and 10–28% of $C_{22}$ acid having 3–6 double bonds), sardine oil (15–30% of $C_{20}$ acid having 2–6 double bonds and 15–20% of $C_{22}$ acid having 3–6 double bonds), methyl 9c,12c,15c-octadecatrienoate, ethyl 9c,11t,13t-octadecatrienoate, diglyceryl 9c-octadecenoate, diglyceryl 9c,12c,15c-octadectrienoate, triglyceryl 9c,12c,15c-octadecatrienoate, $C_{30}$-hexane (squalene), farnesol, farnesyl pyrophosphate, vitamin A, vitamin A aldehyde, vitamin K, carotene, lycopine, hydrolysis products of highly unsaturated fats or oils, for example herring oil fatty acids (mixture of 4–6% of myristic acid, 9–11% of palmitic acid, 8–15% of oleic acid, 2–4% of linoleic acid, 20–30% of $C_{20}$ acid having 2–6 C═C bonds), linseed oil fatty acid (5–8% of palmitic acid, 2–4% of stearic acid, 15–25% of oleic acid, 12–16% of conoleic acid and 50–60% of lineolic acid) or generally fatty acid mixtures having a high proportion of unsaturated fatty acids and/or polyunsaturated alcohols or alcohol mixtures having a high proportion of polyunsaturated alcohols.

Compounds which contain three or more double bonds per molecule, for example lineoleic acid, carotene, linseed oil and linseed oil fatty acid, are particularly advantageous.

These compounds are added in an amount of from 0.1 to 8, in particular from 0.2 to 4%, by weight, based on the amount of chromium dioxide, during the preparation of the dispersion which forms the magnetic layer. It is of course also possible to treat the magnetic material with the stated compounds before the said material is introduced into the dispersing process. However, the addition is preferably effected before or during dispersing. This makes it possible additionally to utilize the dispersing action and to achieve a good and uniform distribution. If further conventional additives which, in addition to other effects, such as improving the frictional properties and the leveling properties, also promote dispersing are used to produce the magnetic layer, the advantageous properties are fully retained when the stabilizer is added.

Suitable magnetic material essentially consisting of chromium dioxide is finely divided, acicular chromium dioxide having a mean particle length from 0.1 to 2 $\mu$m, in particular from 0.1 to 0.9 $\mu$m, alone or as a mixture with not more than 40% by weight of ferromagnetic iron oxides, especially acicular gamma-iron(III) oxide and cobalt-modified gamma-iron(III) oxide. When the magnetic iron oxides used were those of the berthollide type, it was observed that the polyunsaturated compounds present in the magnetic layer of the novel recording media also had a stabilizing effect on the iron-(II) content, which can be altered by oxidation.

Suitable binders for the dispersion of the finely divided magnetic material are the binders known for the production of magnetic layers, such as a copolyamide which is soluble in conventional solvents, a polyvinylformal, a polyurethane elastomer, mixtures of polyisocyanates and higher molecular weight polyhydroxy compounds or vinyl chloride polymers having more than 60% of vinyl chloride molecular building blocks, for example a vinyl chloride copolymer with one or more comonomers, such as, a vinyl ester of a monocarboxylic acid of 2 to 9 carbon atoms, or an ester of an aliphatic alcohol of 1 to 9 carbon atoms and an ethylenically unsaturated carboxylic acid of 3 to 5 carbon atoms, such as the esters of acrylic acid, methacrylic acid or maleic acid, or a copolymer of vinyl chloride with one or more of these carboxylic acids themselves as comonomers, or hydroxyl-containing vinyl chloride copolymers which can be prepared by partial hydrolysis of vinyl chloride/vinyl ester copolymers or direct copolymerization of vinyl chloride with hydroxyl-containing monomers, such as allyl alcohol or 4-hydroxybutyl or 2-hydroxyethyl (meth)-acrylate.

Preferably used polyurethane elastomer binders are commercial elastomer polyesterurethanes obtained from adipic acid, 1,4-butanediol and 4,4'-diisocyanatodiphenylmethane, as described in, for example, German Published Application DAS 1,106,959 or DAS 2,753,694. The polyurethanes may be used as the sole binder or, preferably, as a mixture with other polymers, e.g. polyvinylformal, a phenoxy resin or PVC copolymers. The second binder component is preferably added in an amount of from 5 to 40%. Any crosslinking of the magnetic recording media which may be necessary, depending on the binder system and property profile of the tape, is effected by reacting the polyurethanes or polyurethane binder mixtures with polyisocyanates. Many organic di-, tri- or polyisocyanates or isocyanate prepolymers having a molecular weight of not more than 10,000, preferably from 500 to 3,000, can be used for crosslinking. Polyisocyanates which carry more than 2 NCO groups per molecule are preferred. Polyisocyanates based on toluylene diisocyanate, hexamethylene diisocyanate or isophorone diisocyanate, which are formed by polyaddition with di- or triols by biuret and isocyanurate formation, have proven particularly suitable. An adduct of toluylene diisocyanate with trimethylolpropane and diethylene glycol is particularly advantageous. The amount of polyisocyanate can vary very greatly depending on the binder system. OH-containing polyureaurethane binders which are crosslinked with polyisocyanate and in which the OH-containing polyureaurethane is obtained by reaction of a polydiol, of a diol and of a primary or secondary amino alcohol and, if required, of a triol with a diisocyanate are also advantageous.

Preferably used solvents are water, cyclic ethers, such as tetrahydrofuran and dioxane, and cyclic ketones, such as cyclohexanone. Depending on the application, the polyurethanes can also be dissolved in other strongly polar solvents, such as dimethylformamide, N-methylpyrrolidone, dimethyl sulfoxide or ethylglycol acetate. It is also possible to mix the stated solvents with aromatics, such as toluene or xylene, and esters, such as ethyl or butyl acetate.

It is also possible to add further known additives to the dispersions to improve the magnetic layer. Examples of such additives are fatty acids, polycarboxylic acids, mono-, di- or polysulfonic acids, phosphoric acids and mixtures thereof, or esters or salts with metals of the first to fourth groups of the Periodic Table, as well as waxes, lecithins, silicone oils and fluorocarbons, and fillers, such as carbon black, graphite, powdered quartz and/or nonmagnetizable silicate-based powders. In general, the total amount of such additives is less than 10% by weight, based on the magnetic layer.

Magnetic layers are produced in a known manner. For this purpose, the magnetic material is dispersed with the monomeric, polyunsaturated compound, the binder, the dispersant and sufficient solvent in a dispersant apparatus, for example a tubular ball mill or a stirred ball mill, if necessary with further additives. To obtain the advantageous binder/pigment ratio, these components can be added to the mixture either in the solid state or in the form of 10–60% strength solutions or 30–60% strength dispersions. It has proven advantageous to continue dispersing until an extremely fine distribution of the magnetic material has been achieved, which may take from 1 to 5 days. A completely homogeneous magnetic dispersion is obtained by subsequent repeated filtration.

The magnetic dispersion is then applied to the nonmagnetizable substrate with the aid of a conventional coating apparatus, for example a knife coater. Suitable nonmagnetic and nonmagnetizable substrates are the conventional substrates, in particular films of linear polyesters, such as polyethylene terephthalate, in general in a thickness of from 4 to 200 $\mu$m, in particular from 6 to 36 $\mu$m. Before the still liquid coating mixture is dried on the substrate, which is advantageously effected at from 50° to 90° C. in the course of from 10 to 200 seconds, the anisotropic magnetic particles are oriented along the intended recording direction by the action of a magnetic field. The magnetic layers can then be calendered and compacted on conventional apparatuses by being passed between heated and polished rollers, if necessary at from 50° to 100° C., preferably from 60° to 80° C. The thickness of the magnetic layer is in general from 1 to 20 $\mu$m, preferably from 2 to 10 $\mu$m.

The novel recording media are distinguished from those which do not contain the monomeric, polyunsaturated organic compound in the magnetic layer by substantially improved stability to the chemical decomposition due to moisture and oxidizable compounds. This means that the undesirable decomposition which has a very adverse effect on the magnetic properties, i.e. disproportionation of the chromium dioxide into chromate and chromium(III) ions, is substantially prevented. Another advantage is that the novel recording media have better recording properties, owing to increased residual induction and improved orientation of the anisotropic magnetic materials.

The Examples which follow illustrate the invention and compare it with prior art experiments. In the Examples and Comparative Experiments, parts and percentages are by weight, unless stated otherwise. The magnetic properties were measured using a vibrating sample magnetometer in a magnetic field of 100 kA/m. The coercive force $H_c$ in [kA/m], the residual induction $M_r$ and the saturated magnetization $M_m$ in [mT] and the orientation ratio Rf, i.e. the ratio of the residual induction in the playing direction to that in the crosswise direction, were determined. In addition, the stability of the magnetic recording media was investigated by measuring the chromate formation by the eluate test according to DIN 38414/S4 and determining the total chromium in the stated eluate.

Base Polymer A

In a heatable reaction vessel having a capacity of 150,000 parts by volume and equipped with a stirrer and reflux condenser, 6,600 parts of a polyester of adipic acid and butanediol (molecular weight 1,100), 730 parts of butanediol, 80 parts of trimethylolpropane and 3,862 parts of diphenylmethane 4,4'-diisocyanate were dissolved in 26,000 parts of tetrahydrofuran and the solution was heated to 55° C. The components were reacted to a final viscosity of 25 Pa.s, after which the mixture was diluted to a solids content of 12.5% with 52,900 parts of tetrahydrofuran. At the same time, the reaction was stopped by adding 50 parts of diethanolamine. The K value of the resulting polymer was 63, measured as a 1% strength solution in dimethylformamide.

EXAMPLE 1

100,000 parts of steel balls, 16,000 parts of the 12.5% strength polyurethane elastomer solution stated in Example A, 10,000 parts of a 10% strength solution of a polyvinylformal, consisting of 82% of vinyl formal, 12% of vinyl acetate and 6% of vinyl alcohol units, 135 parts of N-tallow fatty 1,3-diaminodioleate, 270 parts of zinc stearate, 40 parts of polyisobutene ($C_{24}$–$C_{28}$), 135 parts of linolenic acid and 13,500 parts of a ferromagnetic chromium dioxide having a mean particle size of 0.5 μm and a length/width ratio of 4:1 and 4,500 parts of tetrahydrofuran were introduced into a steel ball mill having a capacity of 100,000 parts by volume and were dispersed for about 190 hours. The dispersion was then filtered under pressure through a filter having a pore diameter of 5 μm. A 20 μm thick polyethylene terephthalate film was coated with the dispersion using a knife coater and, after passing through a magnetic field, the coating was dried at from 60° to 100° C. The magnetic layer was compacted and calendered by being passed between heated rollers (70° C., nip pressure 200 kg/cm). The resulting thickness was 5 μm. The coated film was then slit into 3.81 mm wide tapes.

The results of the measurements are shown in the Table.

COMPARATIVE EXPERIMENT 1

The procedure described in Example 1 was followed, but without the addition of linolenic acid.

COMPARATIVE EXPERIMENT 2

The procedure described in Example 1 was followed, but without the addition of zinc stearate and linolenic acid.

EXAMPLE 2

The procedure described in Example 1 was followed, but without the addition of zinc stearate.

EXAMPLE 3

The procedure described in Example 1 was followed but carotene was used instead of linolenic acid.

EXAMPLE 4

The procedure described in Example 1 was followed, but 540 parts of linseed oil were used instead of 135 parts of linolenic acid.

EXAMPLE 5

100,000 parts of steel balls, 5,000 parts of the 12.5% strength polyurethane elastomer solution stated in Example A, 3,000 parts of a 10% strength solution of a polyvinylformal, consisting of 82% of vinyl formal, 12% of vinyl acetate and 6% of vinyl alcohol units, 135 parts of N-tallow fatty 1,3-diaminodioleate, 270 parts of zinc stearate, 40 parts of polyisobutene ($C_{24}$-$C_{28}$), 337 parts of linseed oil and 13,500 parts of a ferromagnetic chromium dioxide pigment having a mean particle size of 0.5 μm and a length/width ratio of 4:1 and 4,500 parts of tetrahydrofuran were introduced into a steel ball mill having a capacity of 100,000 parts by volume and were dispersed for 70 hours. Thereafter, 11,000 parts (12.5% strength) of polymer A and 7,000 parts of the stated 10% strength polyvinylformal solution were added and dispersing was continued for a further 20 hours. The dispersion was then removed from the mill and filtered under pressure through a filter having a pore diameter of 5 μm. After the filtration, 17 g of a 50% strength solution of a triisocyanate obtained from 3 moles of toluylene diisocyanate and 1 mole of trimethylolpropane were added per kg of dispersion, with vigorous stirring. The dispersion was then applied to an 8 μm thick polyethylene terephthalate film by means of a conventional knife coater. The coated film was passed through a magnetic field to orient the magnetic particles and then dried at from 50° to 90° C. After drying, the magnetic layer was compacted and calendered, so that the thickness of the magnetic layer was 5 μm. The coated film was then slit into 3.81 mm wide tapes.

The result of the measurements are shown in the Table.

COMPARATIVE EXPERIMENT 3

The procedure described in Example 4 was followed, but without the addition of the linseed oil and of the crosslinking agent.

EXAMPLE 6

The procedure described in Example 4 was followed, but 200 parts of linseed oil fatty acid were used instead of the linseed oil.

TABLE

| Rf | Magnetic properties | | | Eluate value [mg CrO$_3$/ l H$_2$O] | Total chromium [mg Cr/ l H$_2$O] |
| --- | --- | --- | --- | --- | --- |
| | H$_c$ [kA/m] | M$_m$ [mT] | M$_r$ [mT] | | |
| Example 1 | 40.1 | 196 | 175 | 3.1 | 2.1 | 1 |
| Comp. Experiment 1 | 40.5 | 189 | 172 | 2.8 | 26.4 | 14 |
| Comp. Experiment 2 | 40.5 | 183 | 148 | 2.5 | 25.8 | 13 |
| Example 2 | 40.5 | 184 | 152 | 2.5 | 2.0 | 1 |
| Example 3 | 40.1 | 188 | 161 | 2.5 | 2.9 | 1.5 |
| Example 4 | 40.3 | 193 | 166 | 2.6 | 4.9 | 2.5 |
| Example 5 | 40.4 | 188 | 161 | 2.4 | 1.1 | 0.5 |
| Comp. Experiment 3 | 40.3 | 188 | 158 | 2.4 | 28.4 | 14 |
| Example 6 | 40.2 | 193 | 168 | 2.6 | 0.9 | 0.5 |

We claim:

1. A magnetic recording medium consisting essentially of a non-magnetic substrate and at least one magnetizable layer applied thereon and comprising a magnetic material consisting essentially of chromium dioxide particles having a mean particle length of from 0.1 to 2 μm dispersed in a polymer binder, wherein the magnetizable layer additionally contains from 0.1 to 8% by weight, based on the amount of chromium dioxide, of linolenic acid.

* * * * *

UNITED STATES PATENT AND TRADEMARK OFFICE
CERTIFICATE OF CORRECTION

PATENT NO. : 5,217,810

DATED : June 8, 1993

INVENTOR(S) : LEHNER et al.

It is certified that error appears in the above-identified patent and that said Letters Patent is hereby corrected as shown below:

item [63]
On the cover page, under "Related U.S. Application Data", "Continuation of Ser. No. 448,948, Dec. 12, 1990, abandoned." should read as follows:

-- Continuation of Ser. No. 448,948, Dec. 12, 1989, abandoned.--

Signed and Sealed this

Eleventh Day of January, 1994

Attest:

BRUCE LEHMAN

*Attesting Officer*      *Commissioner of Patents and Trademarks*